United States Patent [19]

Toibana et al.

[11] Patent Number: 4,507,224

[45] Date of Patent: Mar. 26, 1985

[54] CERAMICS CONTAINING FIBERS OF SILICON CARBIDE

[75] Inventors: Yasuo Toibana, Osaka; Kazuo Ueno, Ikeda, both of Japan

[73] Assignees: Agency of Industrial Science & Technology; Ministry of International Trade & Industry, both of Tokyo, Japan

[21] Appl. No.: 556,551

[22] Filed: Nov. 30, 1983

[30] Foreign Application Priority Data

Dec. 3, 1982 [JP] Japan .............................. 57-213026
Dec. 3, 1982 [JP] Japan .............................. 57-213027

[51] Int. Cl.³ .............................................. H01B 1/04
[52] U.S. Cl. ................................... 252/516; 252/517; 252/518; 252/519; 252/520; 252/521; 428/627; 428/629; 501/88; 501/89

[58] Field of Search ............... 252/516, 517, 518, 519, 252/520, 521; 501/87–93; 428/627, 628, 629, 632, 633

[56] References Cited

U.S. PATENT DOCUMENTS

| | | | |
|---|---|---|---|
| 3,607,790 | 9/1971 | Pitha | 252/516 |
| 3,849,145 | 11/1974 | Pitha | 252/516 |
| 4,098,725 | 7/1978 | Yamamoto et al. | 252/516 |
| 4,110,260 | 8/1978 | Yamamoto et al. | 252/516 |

*Primary Examiner*—Josephine L. Barr
*Attorney, Agent, or Firm*—Oblon, Fisher, Spivak, McClelland & Maier

[57] ABSTRACT

Ceramics incorporating fibrous crystals of silicon carbide, optionally, in combination with an electroconductive substance have high electroconductivity and are amenable to electric discharge machining.

11 Claims, No Drawings

CERAMICS CONTAINING FIBERS OF SILICON CARBIDE

BACKGROUND OF THE INVENTION

This invention relates to composite ceramics, and more particularly to composite ceramics which have high electroconductivity and are amenable to electric discharge machining.

Because of their outstanding ability to resist heat and oxidation, ceramics are attracting keen attention as heat resistant materials and as materials for structural members for use in machines. For the production of oxide ceramics of high strength and high density, the hot molding process otherwise known popularly as the hot press process is generally accepted as a suitable method. However, with this process only molds of relatively simple shape can be used for the molding of the raw materials so that manufacture of ceramic parts of complicated shape is difficult. Thus, the hot press process has limited applicability. As another method available for the production of ceramics, the firing process which obtains ceramics by firing raw materials in an atmosphere of air or some other gas has found widespread adoption despite its incapability of conferring as high strength upon the produced ceramics as the hot press process. This aerial firing process entails undesirable phenomena such as shrinkage due to firing and, therefore, cannot easily be used to produce parts of high dimensional accuracy in a single step of firing.

In both of the aforesaid conventional processes it is necessary first to produce a sintered body approximating the desired shape and then to machine the sintered body to high accuracy. Unfortunately, these sintered masses or ceramics are generally very brittle. Because of this particular fault, they cannot be so readily shaped by machining as metal materials and can only be machined at limited speeds with inferior dimensional accuracy. To ensure thorough exploitation of the various outstanding properties of ceramics and promote extensive utility of ceramics in applications to various structural members, therefore, development of a process capable of machining ceramics in desired shapes with as high accuracy as is obtainable with metal materials and/or development of novel materials of ceramics amenable to machining with high accuracy are prerequisites. In the manufacture of parts of heat exchangers, valves, toothed wheels, and gas turbine blades, for example, three-dimensional machining is as important as any other simple shaping operation. With metal materials, the electric discharge technique permits the curved surfaces of such parts to be shaped accurately and, therefore, enables die members of complicated shape to be effectively manufactured. Most ceramics are, however, of inferior electroconductivity and cannot be machined by the electric discharge method.

One object of this invention is to provide ceramics which are as amenable to electric discharge machining as metal materials.

SUMMARY OF THE INVENTION

The inventors of this invention made an extensive study with a view to eliminating or at least alleviating the difficulties encountered in the machining of ceramics. They have consequently discovered that ceramics containing dispersed therein a specified amount of fibrous crystals of silicon carbide (generally called crystal whiskers or simply whiskers) meet the requirement.

To be specific, this invention relates to ceramics of a specific resistance not exceeding 10 Ω·cm, using as the matrix phase thereof one member selected from the group consisting of the oxides of the elements of Group II, Group III and Group IV of the Periodic Table of Elements, and having dispersed in the aforementioned matrix phase fibrous crystals of silicon carbide in an amount falling in the range of 5 to 50% by weight based on the combined amount of the composite and to ceramics of a specific resistance not exceeding 10 Ω·cm, using as matrix phase thereof one member selected from the group consisting of the oxides, nitrides, and carbides of the elements of Group II, Group III and Group IV of the Periodic Table of Elements, and having dispersed in the aforementioned matrix phase fibrous crystals of silicon carbide in an amount falling in the range of 5 to 50% by weight and the powder of at least one member selected from the group consisting of electroconductive carbides, nitrides and borides in an amount falling in the range of 2 to 20% by weight, respectively based on the combined amount of the composite.

DESCRIPTION OF PREFERRED EMBODIMENTS

Now, the ceramics of the present invention will be described in detail below. The ceramics (A) of this invention have their matrix phase formed of one member selected from the group consisting of the oxides of the elements of Group II, Group III, and Group IV of the Periodic Table of Elements and have fibrous crystals of silicon carbide (hereinafter referred to as "fibrous SiC" for short) dispersed in the aforementioned matrix phase. The ceramics (B) of this invention have their matrix phase formed of one member selected from the group consisting of the oxides, nitrides, and carbides of the elements of Group II, Group III and Group IV of the Periodic Table of Elements and have dispersed in the aforementioned matrix phase fibrous SiC and at least one member selected from the group consisting of electroconductive carbides, nitrides and borides. In either of the two types of ceramics mentioned above, the compound used as the matrix phase may incorporate therein small amounts of stabilizer and sintering agent insofar as their presence has no adverse effects upon the properties of the produced ceramics.

Now, the ceramics of the type (A) will be described.

Although the length and diameter of the SiC fibers are not specifically defined, it is advantageous to use SiC fibers whose length falls in the range of about 10 to 500 μm, preferably 50 to 500 μm and whose diameter falls in the range of about 0.1 to 10 μm, preferably 0.5 to 3 μm. Addition of SiC fibers of less than 10 μm in length is not preferable since in such case the amount of SiC fibers that has to be added to obtain a high enough electroconductivity to make electric discharge machining is very large, namely as large as would be required should powdery SiC be used. Addition of SiC fibers in such a large amount is liable to impair the inherent properties of the ceramics. If SiC fibers have a diameter of less than 0.1 μm, they are broken in the course of ceramic manufacture or molding and, therefore, are liable to give results similar to that obtained when powdery SiC is used. If the diameter of the SiC fibers exceeds 10 μm, the rigidity of SiC fibers becomes so high as to make it difficult to obtain a fine-textured ceramics by sintering.

The amount of the fibrous SiC to be incorporated in the ceramics is desired to fall in the range of 5 to 50% by weight based on the combined amount of the composite. If the amount of the fibrous SiC is less than 5%, desired improvement in the electroconductivity of the sintered ceramic body is not amply obtained. If the amount exceeds 50%, then the texture of sintered bodies (ceramics) is liable to become coarse. Ceramics containing the fibrous SiC in amounts of 10 to 40% by weight based on the combined amount of the composite possess especially desirable properties.

As the oxide to form the matrix phase of the ceramics of this invention, any of the known oxides of the elements of Group II, Group III and Group IV of the Periodic Table of Elements can be used. Examples of the oxide include monoxides such as alumina, zirconia, magnesia, ferrites such as $Fe_2O_3$, uranium oxide and thorium oxide, various spinel type compounds such as $MgAl_2O_4$, $NiFeO_4$, $NiCrO_4$ and $MgFe_2O_4$, and composite oxides of Perovskite structure such as $LaCrO_3$, $LaSrCrO_3$ and $SrZrO_3$.

Now, the ceramics of the type (B) will be described.

The shape and the content of fibrous SiC to be used in the ceramics (B) are entirely the same as those in the ceramics (A).

When the matrix phase is formed of an oxide, the kind of the oxide and the other particulars thereof are entirely the same as those of the ceramics (A). Examples of the nitride to be used for forming the matrix phase include silicon nitride, aluminum nitride and boron nitride. Examples of the carbide to be similarly used include silicon carbide, boron carbide and titanium carbide. Any of the other numerous nitrides and carbides known to the art may be used. As the electroconductive powder, at least one member selected from the group consisting of carbides, nitrides and borides in a powdered form can be used. Examples of such carbide include SiC, TiC, ZrC, $B_4C$, WC, HfC, TaC and NbC. Examples of such nitride include TiN, TaN, ZrN, NbN and VN. And Examples of such boride include $TiB_2$, $ZrB_2$, $HfB_2$ and $TaB_2$. The kind of the electroconductive powder and the amount of the powder to be used are determined in due consideration of the amount of fibrous SiC to be incorporated and the electroconductivity of the powder itself. Among the electroconductive compounds in a powdered form mentioned above, those which prove practically advantageous are SiC, TiN, TiC and $B_4C$ in a powdered form.

If the combined amount of the fibrous SiC and the electroconductive powder exceeds 70% by weight based on the combined amount of the composite, however, there ensues a disadvantage that the properties inherent in the matrix ceramics are impaired. If the content of the electroconductive powder is less than 2%, the ceramics' amenability to electric discharge machining cannot be improved to any appreciable extent. If this content exceeds 20%, there ensues a disadvantage that the mechanical property of the ceramics (specifically the strength at elevated temperatures exceeding 800° C.) is degraded. The particle diameter of the electroconductive powder, though not specifically defined, is generally desired not to exceed 2 $\mu$m, preferably not to exceed 1 $\mu$m. If the particle diameter is too large, no improvement in the ceramics' electric discharge property is discernible and the ceramics tend to lose strength.

The electroconductive powder is intended to improve the electric discharge property of the ceramics. When the electroconductive powder and the matrix phase of the ceramics are the same substance, the electroconductive powder will be absorbed in the matrix phase and will consequently be deprived of its inherent role while the composite is being sintered. To avoid this, it is advisable to use a different substance for the electroconductive powder than that used for the matrix phase. In this case fine electroconductive particles will remain at the crystal boundaries of the matrix phase so as to give the produced ceramics improved amenability to electric discharge machining.

The ceramics of this invention are manufactured by a procedure which comprises adding to compound powders selected to make the matrix phase and prepared in a powdered form a stated amount of fibrous crystals of SiC and optionally a stated amount of an electroconductive powder, mixing them thoroughly to form a homogeneous blend, combining the blend with about 0.1 to 2% by weight, based on the amount of the final composite, of a binding agent, molding the resultant composite in a desired shape, drying the shaped composite, and firing the dry shaped composite.

Examples of the binding agent which is advantageously used in the manufacture of the ceramics include polyvinyl alcohol, acrylic resin, cellulose and sodium alginate as dissolved suitably in water, alcohol or other organic solvents.

To be more specific, the procedure for the manufacture of ceramics comprises the steps of mixing the powdered compound destined to form the matrix phase, the fibrous crystals of SiC, the electroconductive powder as an optional component, and the binding agent thereby preparing a pasty mixture, molding the pasty mixture in a desired shape such as by injection molding or extrusion molding, subjecting the molded mixture to a preliminary drying treatment under application of heat or under a vacuum, then heating the dried mixture to temperatures not exceeding 600° C. thereby expelling the binding agent from the mixture, and finally firing the dry molded composite under application, or no application, of pressure at a temperature of about 1300° to 1800° C. in the case of the ceramics (A) or about 1200° to 2000° C. in the case of the ceramics (B).

Optionally, a small amount of MgO may be used as a sintering aid where the matrix phase is formed of $Al_2O_3$ or a small amount of an oxide such as MgO, $Y_2O_3$ or $Al_2O_3$ or of a nitride may be used similarly where the matrix phase is formed of $Si_3N_4$.

The ceramics of this invention are amenable to electric discharge machining and, therefore, permit production of complexly shaped machine parts. Optionally, they may be obtained in large blocks from which numerous small parts can be fabricated with high efficiency.

Particulary, the ceramics of the type incorporating an electroconductive substance possess high electroconductivity and, therefore, exhibit notably high amenability to electric discharge machining. As compared with the ceramics which contain only fibrous SiC, these ceramics have a finely divided electroconductive particles uniformly dispersed throughout the sintered texture of the ceramics and, accordingly, acquire higher discharge machining property. Specifically, they acquire higher electroconductivity such that electric discharge machining may be carried out thereon at higher speeds. Further, since the conduction of electricity within the texture is uniformized to a greater extent, the accuracy of surface finish can be proportionately heightened. The improved electroconductivity brings about an effect of enabling the electric discharge machining to provide more uniform planar or linear cutting and of mitigating the surface roughness.

Now, the present invention will be described more specifically below with reference to working examples and comparative experiments.

EXAMPLE 1

With 100 parts by weight of $Al_2O_3$ powder (0.2 to 1 $\mu$m in particle diameter), 2 parts by weight of MgO as a sintering aid and 100 parts by weight of fully dispersed SiC whiskers (0.5 to 5 $\mu$m in diameter and 50 to 500 $\mu$m in length) were thoroughly mixed. The resultant mixture was sintered under pressure 300 kg/cm$^2$ at 1700° C. Consequently, there was obtained a ceramic piece having relative density of 100%. This ceramic piece was tested for specific resistance, strength at room temperature, and strength at elevated temperatures (900° C.). The results were as shown in Table 1. The strength at room temperature and the strength at elevated temperatures were substantially equal to those of a sintered mass of alumina and the electroconductivity was high enough to permit machining by the electric discharge process.

EXAMPLE 2

With 100 parts by weight of zirconium oxide $ZrO_2$ (0.2 to 1 $\mu$m in particle diameter; containing 3% of yttrium oxide as powdered stabilizer), 20 parts by weight of fully dispersed SiC whiskers (0.1 to 5 $\mu$m in diameter and 50 to 500 $\mu$m in length) was thoroughly mixed. The resultant mixture was sintered under pressure 300 kg/cm$^2$ at 1500° C. Consequently, there was obtained a ceramic piece having relative density of 100%. The physical properties of this ceramic piece were as shown in Table 1.

COMPARATIVE EXPERIMENT 1

The procedure of Example 1 was repeated, except that use of SiC whiskers was omitted. The ceramic article consequently obtained exhibited physical properties as shown in Table 1.

COMPARATIVE EXPERIMENT 2

The procedure of Example 2 was repeated, except that use of SiC whiskers was omitted. The ceramic article consequently obtained exhibited physical properties as shown in Table 1.

TABLE 1

|  | Specific resistance ($\Omega \cdot cm$) | Strength at room temperature (kg/mm$^2$) | Strength at 900° C. (kg/mm$^2$) |
| --- | --- | --- | --- |
| Example 1 | 2.5 | 65 | 30 |
| Comparative Experiment 1 | $10^{15}$ | 60 | 25 |
| Example 2 | 1.2 | 90 | — |
| Comparative Experiment 2 | $10^6$ | 120 | — |

It is noted from the data that the ceramic pieces obtained in the comparative experiments showed levels of strength virtually equal to the levels of strength shown by the ceramic pieces obtained in the corresponding working examples. They nevertheless showed notably high levels of specific resistance, indicating that they were not amenable to electric discharge machining.

EXAMPLE 3

With 100 parts by weight of $Si_3N_4$ powder (0.5 to 2 $\mu$m in particle diameter), 5 parts by weight of MgO as a sintering aid, 30 parts by weight of amply dispersed SiC whiskers (0.1 to 5 $\mu$m in diameter and 50 to 500 $\mu$m in length), 10 parts by weight of SiC powder (not more than 1 $\mu$m in particle diameter), and 2 parts by weight of polyvinyl alcohol as a binding agent were thoroughly mixed to form paste. This paste was molded in the shape of a thin sheet by the vacuum filtration method. The thin plate was dried at 130° C. for 10 hours and then sintered under a pressure of 300 kg/cm$^2$ at 1800° C. Consequently, there was obtained a ceramic piece having relative density of 100%.

The ceramic piece was tested for specific resistance, linear machining speed in the wire cut electric discharge machining operation, surface coarseness of machined surface, and strength at room temperatures. The results were as shown in Table 2. In this case, the wire cut electric discharge machining was performed under the conditions of a discharge pulse width of 6 $\mu$.sec, a discharge interruption of 20 $\mu$.sec, a current peak value of 3.5 A, a tap voltage of 100 V, and a wire diameter of 20 $\mu$m.

COMPARATIVE EXPERIMENT 3

A ceramic piece was obtained by repeating the procedure of Example 3, except that addition of SiC powder as an electroconductive powder was omitted. The physical properties of the ceramic piece were as shown in Table 2.

COMPARATIVE EXPERIMENT 4

A ceramic piece was obtained by repeating the procedure of Example 3, except that addition of SiC whiskers and SiC powder was omitted. The physical properties of the ceramic piece were as shown in Table 2. Since this ceramic piece was incapable of being machined by electric discharge technique, data on machining speed and surface coarseness are not included.

TABLE 2

|  | Specific resistance ($\Omega \cdot cm$) | Linear machining speed (mm/min) | Surface coarseness, $R_{max}$ ($\mu$) | Strength at room temperature (kg/mm$^2$) |
| --- | --- | --- | --- | --- |
| Example 3 | 0.1 | 1.7 | 15 | 75 |
| Comparative Experiment 3 | 0.6 | 0.6 | 53 | 60 |
| Comparative Experiment 4 | $10^{12}$ | — | — | 85 |

EXAMPLE 4

With 100 parts by weight of $Al_2O_3$ powder (0.2 to 1 $\mu$m in particle diameter), 2 parts by weight of MgO as a sintering aid, 100 parts by weight of amply dispersed SiC whiskers (0.1 to 5 $\mu$m in diameter and 50 to 500 $\mu$m in length), and 5 parts by weight of TiN powder (0.2 to 1.5 $\mu$m in particle diameter) as an electroconductive powder were thoroughly mixed. The resultant mixture was sintered under a pressure of 300 kg/cm$^2$ at 1700° C. to obtain a ceramic piece having a relative density of 100%.

This ceramic piece was tested for specific resistance, linear machining speed in the wire cut electric discharge machining operation, surface coarseness of machined surface, and strength at room temperature. The results were as shown in Table 3. In this case, the wire cut electric discharge machining was performed under the conditions of a discharge pulse width of 8 $\mu$.sec, a discharge interruption of 15 $\mu$.sec, a current peak value of 8.5 A, a tap voltage of 110 V, and a wire diameter of 20 $\mu$m.

EXAMPLE 5

A ceramic piece was obtained by following the procedure of Example 4, except that the amount of the TiN powder as an electroconductive powder was increased to 20 parts by weight. The physical properties of this ceramic piece were as shown in Table 3.

COMPARATIVE EXPERIMENT 5

A ceramic piece was obtained by following the procedure of Example 4, except that the addition of the SiC whiskers and the TiN powder was omitted. The physical properties of the ceramic piece were as shown in Table 3.

TABLE 3

| | Specific resistance ($\Omega \cdot$ cm) | Linear machining speed (mm/min) | Surface coarseness, $R_{max}$ ($\mu$) | Strength at room temperature (kg/mm$^2$) |
| --- | --- | --- | --- | --- |
| Example 4 | 1.7 | 0.8 | 25 | 70 |
| Example 5 | 1.1 | 1.5 | 13 | 72 |
| Comparative Experiment 5 | 2.5 | 0.1 | 48 | 65 |

What is claimed is:

1. A silicon carbide-containing ceramic article of specific resistance not exceeding 10 $\Omega$·cm, using as matrix phase thereof one member selected from the group consisting of alumina, zirconia, magnesia, ferrites, uranium oxide, thorium oxide, MgAl$_2$O$_4$, NiFeO$_4$, NiCrO$_4$, MgFe$_2$O$_4$, LaCrO$_3$, LaSrCrO$_3$ and SrZrO$_3$, and having dispersed in said matrix phase fibrous crystals of silicon carbide 10 to 500 $\mu$m in length and 0.1 to 10 $\mu$m in diameter in an amount falling in the range of 5 to 50% by weight based on the combined amount of the composite.

2. The silicon carbide-containing ceramic article according to claim 1, wherein said fibrous crystals of silicon carbide have a length of 50 to 500 $\mu$m.

3. The silicon carbide-containing ceramic article according to claim 1, wherein said fibrous crystals of silicon carbide have a diameter of 0.5 to 3 $\mu$m.

4. The silicon carbide-containing ceramic article according to claim 1, wherein said fibrous crystals of silicon carbide are incorporated as dispersed in an amount of 10 to 40% by weight based on the combined amount of the composite.

5. A silicon carbide-containing ceramic article of specific resistance not exceeding 10 $\Omega$·cm, using as matrix phase thereof one member selected from the group consisting of alumina, zirconia, magnesia, ferrites, uranium oxide, thorium oxide, MgAl$_2$O$_4$, NiFeO$_4$, NiCrO$_4$, MgFe$_2$O$_4$, LaCrO$_3$, LaSrCrO$_3$ and SrZrO$_3$, silicon nitride, aluminum nitride, boron nitride, silicon carbide, boron carbide and titanium carbide, and having dispersed in said matrix phase fibrous crystals of silicon carbide 10 to 500 $\mu$m in length and 0.1 to 10 $\mu$m in diameter in an amount falling in the range of 5 to 50% by weight, and a powder of at least one electroconductive compound selected from the group consisting of SiC, TiC, ZrC, B$_4$C, WC, HfC, TaC, NbC, TiN, TaN, ZrN, NbN, VN, TiB$_2$, ZrB$_2$, HfB$_2$ and TaB$_2$ in an amount falling in the range of 2 to 20% by weight, respectively based on the combined amount of the composite.

6. The silicon carbide-containing ceramic article according to claim 5, wherein said fibrous crystals of silicon carbide have a length of 50 to 500 $\mu$m.

7. The silicon carbide-containing ceramic article according to claim 5, wherein said fibrous crystals of silicon carbide have a diameter of 0.5 to 3 $\mu$m.

8. The silicon carbide-containing ceramic article according to claim 5, wherein said fibrous crystals of silicon carbide are incorporated as dispersed in an amount of 10 to 40% by weight based on the combined amount of the composite.

9. The silicon carbide-containing ceramic article according to claim 5, wherein the combined amount of said fibrous crystals of silicon carbide and said powder of at least one electroconductive compound is at most 70% by weight based on the combined amount of the composite.

10. The silicon carbide-containing ceramic article according to claim 5, wherein said powder of at least one electroconductive compound is selected from the group consisting of SiC, TiN, TiC and B$_4$C.

11. The silicon carbide-containing ceramic article according to claim 5, wherein said powder of at least one electroconductive compound is a different material from the material of said matrix phase.

* * * * *